Figure 1:
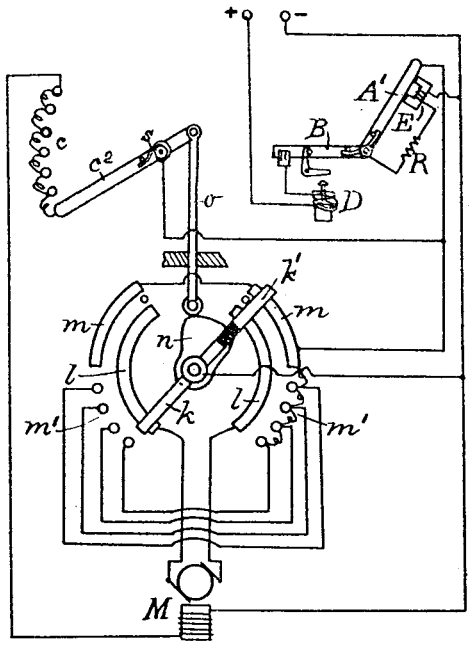

H. W. LEONARD.
CONTROLLER FOR ELECTRIC MOTORS AND SIMILAR DEVICES.
APPLICATION FILED MAY 17, 1907. RENEWED JULY 18, 1910.

1,077,614.  Patented Nov. 4, 1913.

UNITED STATES PATENT OFFICE.

HARRY WARD LEONARD, OF BRONXVILLE, NEW YORK.

CONTROLLER FOR ELECTRIC MOTORS AND SIMILAR DEVICES.

1,077,614.   Specification of Letters Patent.   Patented Nov. 4, 1913.

Original application filed July 11, 1903, Serial No. 165,061. Divided and this application filed May 17, 1907, Serial No. 374,180. Renewed July 18, 1910. Serial No. 572,581.

*To all whom it may concern:*

Be it known that I, HARRY WARD LEONARD, a citizen of the United States, residing at Bronxville, in the county of Westchester and State of New York, have invented certain new and useful Improvements in Controllers for Electric Motors and Similar Devices, of which the following is a full, clear, and exact specification.
This application is a division of my pending application for improvement in controllers for electric motors and similar devices, filed July 11, 1903, Serial No. 165061, on which Letters Patent No. 855,897, was granted June 4, 1907.

My invention relates principally to the devices employed for starting and regulating the speed of electric motors, and to the devices employed for protecting such devices and the motor against damage due to abnormal variations in the circuit. Heretofore such devices, and particularly the starters and field controllers, were preferably entirely separate pieces of apparatus and were operated independently of each other. Such arrangement of the controlling devices is frequently the cause of injury to the motor and controlling means due to the improper operation of the separate devices and to carelessness or ignorance on the part of the operator.

One object of my invention is to combine a motor starter, speed regulator and automatic protective devices with interlocking means, whereby the several elements constituting a controller can only be operated in the proper sequence to start and regulate a motor, and so that the protective devices will always be in a position to respond to abnormal changes in the motor circuit, and whereby the starting of a motor and the control of its speed will be "fool proof"; that is to say, the controlling apparatus and the motor will be entirely safe, even in the hands of inexperienced, careless or ignorant operators.

In the operation of many kinds of machine tools and other appliances by electric motors, it is very desirable that there be provided a simple, efficient, reliable, inexpensive and compact form of controlling apparatus by means of which the motor can be started and brought to full speed, and later, if necessary, operated at any speed over as wide a range of speed as possible. On account of the efficiency and simplicity of the method, it is very desirable to secure the speed variation by varying the field strength of the motor. Electric motors have now been so far improved as regards freedom from sparking, that they require very little attention in operation, even when the field is varied over a very wide range, and hence in the future these motors will be very extensively employed in the operation of machine tools and in performing many other kinds of work where a wide range of speed is of value, and especially where the torque varies inversely as the speed to such an extent that the power of the motor is more or less constant. The controlling apparatus for such motors should have the following characteristics:—First, an overload protective device which will positively and instantaneously open the circuit to the motor if under any conditions of starting or operation a current greater than a certain predeterminable amount should flow in the motor circuit. Second, this overload device must be such that the motor can be safely and simply started up again by the operator without loss of time and without expense. Third, a "no-voltage release" or electro-responsive device which will automatically act if the supply voltage fails, or is reduced to a very low point, to protect the motor against the risks due to a sudden rise to full voltage, and such "no-voltage" device shall be dependent upon the volts upon the motor armature and shall be independent of any current through the motor. Fourth, a device by the manipulation of which the operator can readily change the speed of the motor gradually and over a wide range, so that, for example, a cutting tool can be worked in the most efficient manner at any speed and cut within the capacity of the motor. Fifth, a starting rheostat. Sixth, interlocking or functionally related mechanism, or equivalent arrangement of mechanism, which will insure the proper sequence of adjustments, and whereby it will be impossible for the operator to start the motor while the motor has an improperly weakened field. While this interlocking or equivalent mechanism is preferably arranged directly between the speed controlling device and the motor starter, it is evident that it may be applied between any device controlling the speed controller and any device which controls the current passing through the motor armature, such as a switch in series with the motor armature and starter.

My invention is illustrated in the accompanying drawings, in which—

Figure 2:
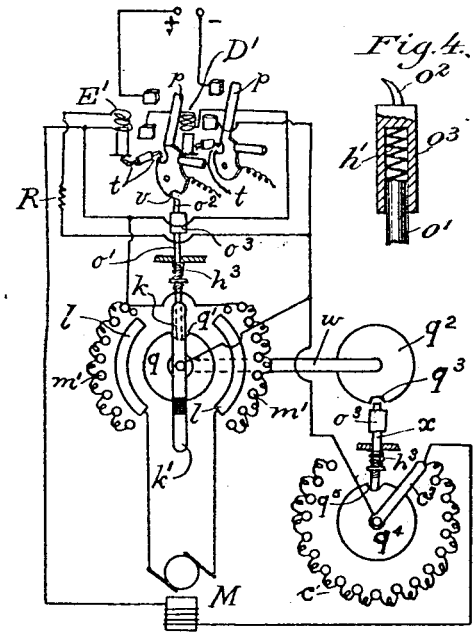
Figure 3:
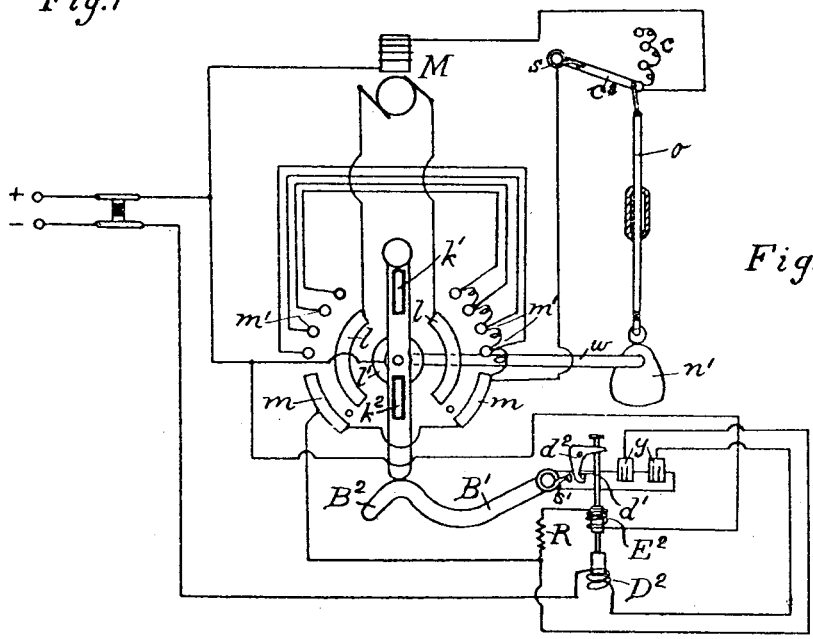

Figure 1 is a diagram illustrating one form of my invention, Figs. 2 and 3 are diagrams of modified forms, and Fig. 4 is a detail view of a yieldable section of a part of the structure of Fig. 2 enlarged.

In Fig. 1 my invention is shown applied to a reversing controller and in which the reversing controller and field rheostat are functionally related so that the resistance of the controller cannot be cut out except when the field is in a certain condition. The armature and field winding of the motor is indicated at M. In the main circuit is a switch comprising the two spring pressed arms A', B, the current passing from one supply terminal through the overload solenoid D, which may act to release arm B and open the circuit, then through arms B and A' through the reversing controller and motor armature to the other supply terminal. Current also passes independently from one side of the line through the resistance R and retaining magnet E to the other side, and there is likewise a circuit across the line including the field of the motor, the field resistance $c$ and the field rheostat arm $c^2$. The movable element of the reversing controller comprises an arm $k$ electrically connected to one side of the line and engaging one or the other of two contact segments $l$ connected to the terminals of the motor armature. The movable element also includes an insulated conducting portion $k'$ which electrically connects the contact segments $l$ with the concentric outer strips $m$ and the contacts $m'$ of the controlling resistance. The operating shaft of the controller carries a cam $n$ on which rides one end of a rod $o$ connected to the field rheostat arm $c^2$, a spring $s$ on arm $c^2$ tending to force the rod against the cam. The position of the arm $c^2$ is consequently determined by the position of the reversing controller. The off position of the controller arm is a vertical one with the part $k'$ downward. Suppose the circuit breaker to be closed and that the controller arm is turned from the off position so that the part $k'$ engages the contacts at the right. The current will then pass from say positive line to right-hand segment $m$, through the armature resistance to part $k'$, segment $l$, motor armature, left-hand segment $l$, arm $k$ to negative line. As the arm is rotated left-handedly, the armature resistance will be gradually cut out and will be all cut out when $k'$ engages segment $m$. During this operation, the rod $o$ has remained at its lowest position by pressure of spring $s$ and all field resistance has therefore been cut out giving a strong field. Upon further movement of the controller, the rod $o$ rides upon an inclined portion of cam $n$, causing field resistance to be gradually cut in giving a further increase in the speed of the motor. This condition is illustrated in the figure. If now it is desired to reverse the motor, the controller arm will be turned in a right-hand direction, which first cuts out the field resistance, then cuts in the armature resistance and then breaks the armature circuit. Continuing the movement brings the part $k'$ in contact with the left-hand contacts and part $k$ in contact with the right hand segment $l$. Current then passes through the armature resistance and armature in the opposite direction giving reversal in rotation. Further movement of the controller arm cuts out the armature resistance while the field is maintained at full strength and afterward weakens the field as previously explained.

In Fig. 2, I have shown a reversing controller, field rheostat and circuit breaker all functionally related so that the circuit breaker cannot be closed except when the reversing controller is in proper condition and the resistance of the reversing controller cannot be cut out except when the field rheostat is in proper condition. I have shown a double pole circuit breaker having spring pressed independently movable arms each adapted to be held in position by mechanical restraining means, as by latches $t$. The arms are released by the upward movement of the core of the overload solenoid D', or the left hand arm $p$ is released by the fall of the core of the no-voltage solenoid E' which is connected across the line in series with a resistance R. The reversing controller is shown as made up of the two contact segments $l$ and two outer series of resistance contacts $m'$, over which moves the controller arm comprising the part $k$ which contacts with segments $l$ and is connected to one side of the line, and the part $k'$ which makes a connection from segments $l$ to the contacts $m'$. The segments $l$ are connected to the motor armature terminals and the two upper contacts $m'$ to one side of the line. Mounted upon the controller shaft is a circular plate $q$ having a recess $q'$ in one part thereof. A rod $o'$ is forced against said plate as by a spring $h^3$ and carries a projection $o^2$ adapted to engage a notch $v$ in one of the circuit breaker arms $p$. The rod $o'$ has a yieldable section as indicated at $o^3$ similar to that shown in Figs. 3 and 4 of my said original application and as shown in Fig. 4 of this case. Mechanically connected with the shaft of the reversing controller, as by the extended shaft $w$ is a circular plate $q^2$ having a notched portion $q^3$. This notch is adapted to receive one end of a rod $x$ which has a yieldable portion $o^3$ and is pressed downward as a whole by spring $h^3$. The lower end of the rod engages a plate $q^4$ having an inclined notched portion $q^5$. This plate is mounted on the shaft of the field rheostat controlling arm $c^3$. The parts are shown in their open position and the arms of the circuit breaker are free to be closed and the reversing rheostat may be operated since the field resistance is all cut out of the field circuit. If, however, the reversing rheostat were in any other than off position, the rod $o'$ would be raised from the notch of plate $q$ and projection $o^2$ would engage the notch $v$ preventing the closing of one arm of the circuit breaker. Also if the field resistance arm were in any position other than that in which all resistance is cut out, the rod $x$ would be raised and engage the notch $q^3$ preventing the movement of the reversing controller to start the motor unless the field has its full strength. Therefore the circuit breaker cannot be closed unless the reversing controller is in off position and the circuits of the reversing controller cannot be closed unless the field resistance is out of circuit. Starting with the armature resistance in, and the field resistance out, is consequently imperative. When the reversing controller is turned in one direction from off position, current passes through the armature in one direction and the armature current is reversed by turning the reversing controller in the opposite direction.

In Fig. 3 I have also shown an interlocked or functionally related reversing controller, field rheostat and circuit breaker. The circuit breaker is shown in the form of a pivoted switch $B'$, spring pressed by spring $s'$ at its pivot so as to tend to move the switch to open the main circuit at contacts $y$. A pivoted latch $d^2$ tends normally to engage the pin $d'$ when the switch is in the closed position and to hold the same closed. A plunger for tripping the latch is shown as having two iron cores. One is acted upon by the coil $E^2$ which forms a circuit across the line in series with a resistance R through switch $B'$ and contacts $y$ and normally tends to hold the plunger up and which, upon occurrence of no-voltage, permits the plunger to fall and trip the latch $d^2$ and allows the circuit breaker to be opened by spring $s'$. The other core is acted upon by coil $D^2$ in series in the main circuit and which upon the occurrence of overload is adapted to draw the plunger down to trip latch $d^2$ and open the circuit.

The reversing controller is provided with the contact segments $l, l$, the contact segments $m$, and the resistance contacts $m'$. The controller arm is provided with an insulated conductor $k^2$ adapted to engage segments $l$ and the plate $l'$ and also provided with an insulated conductor $k'$ adapted to connect the segments $l$ with the segments $m$ or resistance contacts $m'$. The controller arm in the position shown, which is the off position, engages an extension $B^2$ of switch $B'$ so as to close the latter. The plate $l'$ is connected to one supply line and the segments $m$ are connected to the other supply line through switch $B'$ and contacts $y$. The segments $l$ are connected to the armature terminals. The motor field coil is shown connected across the line in series with a variable resistance $c$ and arm $c^3$. The arm $c^3$ is pressed by a spring $s$ tending to return it to such a position that no field resistance is included and also tending to press the rod $o$ which is attached to arm $c^3$, against a cam $n'$. The cam $n'$ is attached to shaft $w$ which is also the shaft of the controller arm. The shape of cam $n'$ is such that in the off position of the controller, rod $o$ is in its lowest position and all field resistance out of circuit.

When the controller arm is moved in one direction the armature circuit will be closed through the starting resistance and when the circuit is first closed the switch $B'$ will be free to open automatically upon occurrence of overload or no-voltage since the controller arm will not then engage the projection $B^2$. As the controller arm is moved, the armature resistance will be gradually cut out and will be entirely cut out when $k'$ makes contact with one of the segments $m$. Up to this position the shape of cam $n'$ is such that rod $o$ remains in its lowest position, but upon further movement of the controller arm, the rod $o$ will be raised and resistance cut in the field circuit. When the controller arm is moved in the opposite direction, a similar action will take place except that the current through the motor armature will be reversed. It is therefore apparent that if the circuit breaker opens, it can be closed and the motor started again only by first returning the controller arm to off position and when the arm is returned to off position, all field resistance will be cut out. In some cases the motor may have a series winding on the field so that the field will be affected by the armature current.

Although I have shown specific forms of my invention herein, my invention may be embodied in various other forms of construction, and it will be understood that my invention is not limited to the precise forms herein shown and described. My invention is also capable of use with currents of different forms and with various types of motors, such as motors of direct or alternating current type.

Having thus described my invention, I declare that what I claim as new and desire to secure by Letters Patent, is,—

1. The combination of independently movable means for controlling the field and armature circuits of an electric motor, one of said means being adapted to reverse the direction of rotation of the motor and also vary resistance in series with its circuit, and means functionally relating the said independent controlling means whereby improper operation of the said two controlling means relatively to each other is prevented.

2. The combination of an electric motor, a reversing rheostat for varying and reversing the current in one element of the motor, correlated rheostatic means for controlling the current in the other element of the motor, and an electro-responsive protective device energized by a current independent of that in the motor armature or field circuit.

3. The combination of an electric motor, a circuit breaker, a reversing controller, a field rheostat, and means for preventing the circuit breaker from being closed except when the reversing controller is in its proper position and for preventing the resistance of the controller from being cut out except when the field rheostat is in its proper position.

4. The combination of an electric motor, a reversing switch for reversing the current in one element of said motor, means in the circuit of the other element of the motor for affecting the current in said circuit, and means for functionally relating said switch and said first named means.

5. The combination of an electric motor, a controlling resistance in series with the armature and a different controlling resistance in series with the field winding, each of said resistances having a coöperating movable element and at least one of said movable elements being movable independently of the other, two switches in series with each other and with said armature, and means protectively correlating said two switches and at least one of said switches to the means for varying the resistance in the field circuit.

6. The combination of a supply circuit, an electric motor, three switches in series with each other and with the motor armature across the supply circuit, each of said switches being independently movable with reference to the others, and means for protectively correlating two of said switches and for protectively correlating at least one of said two switches and the said third switch.

7. The combination of an electric motor, and controlling means comprising a movable element for reversing the armature connections and for inserting resistance in series with the armature, and a second movable element protectively related to said first named element for varying the motor field strength.

8. The combination of an electric motor, and controlling means comprising a movable element for varying and reversing the electromotive force applied to one elemental winding of the motor, and a second movable element protectively related to said first named element for varying the electromotive force applied to the other elemental winding of the motor.

9. The combination of an electric motor, controlling means comprising means for varying and reversing the electromotive force applied to the motor armature, and protectively related means for varying the motor field strength.

10. The combination of an electric motor, two automatic switches in series with each other and with the motor armature, said switches being adapted to be independently or simultaneously opened upon overload through the motor armature, and means for varying and reversing the current in the motor armature and for varying its field strength.

11. The combination of an electric motor having a field winding energized independently of its armature current, two independently manually closable switches in series with each other and with the motor armature, means for automatically opening each of said switches if the other be closed so as to cause an overload, a reversing rheostat for varying and reversing the current in one of the elemental windings of the motor, and a functionally connected rheostatic element for varying the current in the other elemental winding of the motor.

12. The combination of an electric motor, two independently closable automatically openable switches in series with each other and with the motor armature, a reversing switch also in series in the circuit of said switches and motor armature, and field controlling means protectively related to said reversing switch.

13. The combination of an electric motor, and controlling means comprising four independently movable circuit controlling elements, one being an armature current reversing element and one being a field varying element, said reversing element and field varying element being protectively related.

14. The combination of an electric motor, and controlling means comprising four independently movable circuit controlling elements, one being an armature current reversing element and one being a field varying element, said reversing element and field varying element being protectively related, and the other two elements being automatically responsive to overload current.

15. The combination of an electric motor, and motor controlling means comprising two automatic switches in series with each other and with the motor armature, said two switches being protectively related to each other, a reversing switch in series with the motor armature, and a field rheostat protectively related to said reversing switch.

16. The combination of an electric motor, two movable elements for controlling the armature and field circuits of the motor respectively, one of said elements being adapted to reverse the current in its respective motor circuit, and means for protectively relating said means for insuring proper sequence of operation.

17. The combination of an electric motor, an armature reversing switch, an automatic overload circuit breaking switch protectively related thereto as regards its closure, a motor field rheostat, and means protectively relating said rheostat to one of said switches for insuring proper motor field strength when the motor is started.

18. The combination of an electric motor, a no voltage and overload circuit breaker, a reversing switch, said switch and circuit breaker being in series with each other and with the motor armature, and means for protectively relating said circuit breaker and switch as to the establishment of the motor starting current.

19. The combination of an electric motor, means for varying and reversing the electromotive force applied to the motor armature and means for varying the field strength of the motor independently of a variation of the armature current, and protective means responsive to no voltage and to overload current through the motor armature.

20. The combination of two independently closable switches, means for causing each of said switches to be automatically responsive to overload and at least one automatically responsive to no voltage, and a protectively related reversing circuit controller in series with said switches.

21. The combination of a movable circuit controlling element, means for causing said element to be automatically responsive to no voltage, and a protectively related reversing circuit controller.

22. The combination of an electric motor, a field rheostat, a reversing motor armature rheostat, and means for protectively interlocking said rheostats.

23. The combination of an electric motor, a reversing motor armature rheostat, a no-voltage and overload circuit breaker, and means for protectively interlocking said rheostat and circuit breaker.

24. The combination of an electric motor, a reversing motor armature rheostat, an automatic circuit breaker, and means for protectively interlocking said rheostat with said circuit breaker.

25. The combination of an electric motor, a motor armature reversing switch, a motor field controlling rheostat, an automatic circuit breaker, and protectively relating means for insuring that the field rheostat is in a proper position when reversing the motor by said reversing switch.

26. The combination of an electric motor having a winding energized independently of its armature current, and means for varying the voltage and reversing the direction of rotation of the motor comprising a variable resistance in series with the motor armature, a variable resistance in series with the field winding, and means for insuring a definite sequence in variation of said resistance when accelerating the motor.

27. The combination of an electric motor having a field winding energized independently of its armature current, a reversing switch in series with one of the motor windings, an overload circuit breaker, and means for insuring that the circuit breaker can be closed only when the reversing switch is open.

28. The combination of an electric motor, a switch, mechanical restraining means for said switch, electro-responsive means comprising two windings one responsive to no-voltage and the other to overload for controlling said switch, and an armature controlling movable element for controlling the closure of said switch.

29. The combination of an electric motor, means for varying and reversing the current through one element of said motor and for varying the current in the other element of the motor, and an automatic controlling switch the closure of which is controlled by said means.

In testimony whereof I affix my signature, in presence of two witnesses.

HARRY WARD LEONARD.

Witnesses:
HENRIETTA D. LEONARD,
CAROLYN G. LEONARD.